(12) United States Patent
Smith

(10) Patent No.: US 10,784,600 B1
(45) Date of Patent: Sep. 22, 2020

(54) SPLIT, LOCKNUT GROUNDING BUSHING

(71) Applicant: Bridgeport Fittings, LLC, Stratford, CT (US)

(72) Inventor: Lawrence J. Smith, Stamford, CT (US)

(73) Assignee: Bridgeport Fittings LLC, Stratford, CT (US)

( * ) Notice: Subject to any disclaimer, the term of this patent is extended or adjusted under 35 U.S.C. 154(b) by 0 days.

(21) Appl. No.: 16/524,801

(22) Filed: Jul. 29, 2019

(51) Int. Cl.
*H01R 11/26* (2006.01)
*H01R 4/64* (2006.01)
*H02G 3/06* (2006.01)

(52) U.S. Cl.
CPC ............. *H01R 11/26* (2013.01); *H01R 4/643* (2013.01); *H02G 3/0616* (2013.01)

(58) Field of Classification Search
CPC ................................. H01L 11/26; H01L 4/643
USPC ........................................................... 439/92
See application file for complete search history.

(56) References Cited

U.S. PATENT DOCUMENTS

| | | | | |
|---|---|---|---|---|
| 5,406,032 A * | 4/1995 | Clayton | .................. | H02G 3/083 174/151 |
| 5,594,202 A * | 1/1997 | Tobias | ..................... | H02G 3/22 174/505 |
| 6,057,601 A * | 5/2000 | Lau | ..................... | H01L 23/3128 257/690 |
| 6,840,782 B1 * | 1/2005 | Borden | .................. | H01R 4/643 439/92 |
| 7,182,611 B2 * | 2/2007 | Borden | .................. | H01R 4/643 439/92 |
| D626,087 S | 10/2010 | Kiely | | |
| 7,901,256 B1 | 3/2011 | Kiely | | |
| 7,915,545 B1 * | 3/2011 | Bixler | ..................... | H02G 3/083 174/653 |
| 7,927,157 B1 | 4/2011 | Kiely | | |
| 8,021,169 B1 | 9/2011 | Smith | | |
| D648,281 S | 11/2011 | Cerasale | | |
| D651,569 S | 1/2012 | Kiely | | |
| D652,388 S | 1/2012 | Cerasale | | |
| 8,106,297 B1 | 1/2012 | Kiely | | |
| D657,316 S | 4/2012 | Kiely | | |
| 8,231,392 B2 * | 7/2012 | Garvin | .................. | H01R 4/643 439/100 |
| 8,272,883 B1 | 9/2012 | Smith | | |
| 8,277,263 B1 | 10/2012 | Smith | | |

(Continued)

OTHER PUBLICATIONS

US 10,003,139 B1, 06/2018, Smith (withdrawn)

*Primary Examiner* — Alexander Gilman
(74) *Attorney, Agent, or Firm* — Ware, Fressola, Maguire & Barber LLP

(57) ABSTRACT

A split, locknut grounding bushing has a first metal bushing portion with first and second ends, a top, a bottom with teeth, an exterior surface with a boss for receipt of a lug, and an interior surface with threads; a second metal bushing portion similar to the first bushing portion, first and second insulators respectively connected to the top of the first and second metal bushing portions. The first and second metal bushing portions pivot with respect to each other at one end and can be fastened to each other at the second end. The threads of the first and second bushing portions can thread onto the threads of a conduit or connector passing through a hole in an electrical enclosure so as to engage the teeth on the bottom of the first and second bushing portions with an interior surface of the enclosure.

11 Claims, 11 Drawing Sheets

(56) References Cited

U.S. PATENT DOCUMENTS

| | | | |
|---|---|---|---|
| 8,410,378 B1 | 4/2013 | Senseney et al. | |
| 8,419,449 B1 * | 4/2013 | Smith | H01R 4/643 |
| | | | 439/92 |
| D703,519 S | 4/2014 | Senseney et al. | |
| 8,809,680 B2 | 8/2014 | Kiely | |
| 8,882,517 B2 * | 11/2014 | Smith | H01R 4/64 |
| | | | 439/92 |
| D721,652 S | 1/2015 | Smith | |
| D722,966 S | 2/2015 | Smith | |
| 9,000,310 B2 | 4/2015 | Smith | |
| 9,012,791 B2 * | 4/2015 | Smith | H02G 3/22 |
| | | | 174/664 |
| D733,064 S | 6/2015 | Smith | |
| 9,059,537 B2 * | 6/2015 | Peuchet | H01R 13/5812 |
| D749,047 S | 2/2016 | Smith | |
| 9,257,795 B2 | 2/2016 | Smith | |
| 9,705,256 B1 | 7/2017 | Smith | |
| 10,027,039 B1 * | 7/2018 | Smith | H01R 4/60 |
| 10,135,230 B1 | 11/2018 | Smith | |
| 10,461,443 B2 * | 10/2019 | Smith | H01R 4/60 |
| 2011/0237140 A1 | 9/2011 | Cerasale | |
| 2015/0053477 A1 * | 2/2015 | Smith | H02G 3/22 |
| | | | 174/660 |
| 2016/0240287 A1 * | 8/2016 | Thomas | H02G 3/06 |

\* cited by examiner

SPLIT, LOCKNUT GROUNDING BUSHING

TECHNICAL FIELD

The present invention relates to electrical fittings, specifically a split, locknut grounding bushing for threaded engagement with threads of an electrical connector or threads of a rigid conduit.

BACKGROUND OF THE INVENTION

Bushings are typically installed at the end of an electrical connector entering a panel box or the like or to the end of a rigid conduit (sometimes referred to as an electrical conduit or a rigid electrical conduit) entering such a panel box or the like.

In many installations, the bushing is installed at the time of initial installation of the panel box. In many installations, the initial electrical fitting or electrical conduit entering a panel box is secured to the panel box by means of a locknut. The electrical wiring is then completed. Often times after installation, it is necessary to install a grounding bushing within the panel box or the like in order to meet electrical code. If the locknut securing the electrical connector or conduit to the panel box does not leave exposed sufficient threads on the connector or conduit, it is difficult to use a conventional split electrical grounding bushing since such bushings are typically threadless and cannot be properly secured to the threaded end of the electrical fitting or conduit.

SUMMARY OF THE INVENTION

The present invention provides a solution to installations in which an electrical connector or conduit is secured to a panel box via a locknut and the amount of exposed thread is insufficient for connection of a split electrical grounding bushing. It does so by providing a new electrical fitting; namely, a split, locknut grounding bushing. That is, a fitting that not only is a split, locknut grounding bushing, but also a locknut that can replace a previously installed locknut.

The present invention relates to a split, locknut grounding bushing comprising a first metal bushing portion having a substantially hemispherical shape with a first end and a second end, the first metal bushing portion further having a top, a bottom, an exterior surface and an interior surface, (wherein the top is dimensioned for receipt of a first insulator), the bottom including a plurality of depending teeth, the interior surface including threads, and the exterior surface including at least one threaded boss for receipt of a lug; a second metal bushing portion having a substantially hemispherical shape with a first end and a second end, the second bushing portion further having a top, a bottom, an exterior surface and an interior surface, and the bottom including a plurality of depending teeth, and the interior surface including threads; a first insulator connected to the top of the first metal bushing portion; a second insulator connected to the top of the second metal bushing portion; means for allowing the first end of the first metal bushing portion and the first end of the second metal bushing portion to pivot with respect to each other; and means for fastening the second end of the first metal bushing portion to the second end of the second metal bushing portion; wherein the threads of the first and second metal bushing portions are dimensioned for threaded engagement with threads of a connector or threads of a conduit passing through a hole in an electrical enclosure so as to engage the teeth on the bottom of the first and second metal bushing portions with an interior surface of an electrical enclosure.

Another embodiment of the present invention is the split, locknut grounding bushing as described above, wherein the means for allowing the first end of the first metal bushing portion and the first end of the second metal bushing portion to pivot with respect to each other comprises the first end of the first metal bushing portion including a projection with a bore passing therethrough and the first end of the second metal bushing portion including two complimentary projections with a bore passing through each of these complimentary projections, and a pin dimensioned for placement through the bore of the projection of the first metal bushing portion and the projections of the second metal bushing portion.

A further embodiment of the present invention is the split, locknut grounding bushing as described above, wherein the means for fastening the second end of the first metal bushing portion to the second end of the second metal bushing portion comprises the second end of the first metal bushing portion including an ear with a bore formed therein and the second end of the second metal bushing portion including an ear with an aperture dimensioned for passage of a fastener; and a retaining ring positioned for placement on the fastener passing through the aperture of the second end of the second metal bushing portion so as to secure the fastener to the bore in the ear of the first metal bushing portion.

A further embodiment of the present invention is the split, locknut grounding bushing as described above, wherein the first and second insulators each have a hemispherical shape respectively corresponding to the top of the first metal bushing portion and second metal bushing portion.

A further embodiment of the present invention is the split, locknut grounding bushing as described above, wherein the first and second insulators each include an exterior groove dimensioned to respectively snap onto a rim formed in the top of the first metal bushing portion and the top of the second metal bushing portions.

A further embodiment of the present invention is the split, locknut grounding bushing as described above, wherein the first and second insulators each include a detent dimensioned to respectively engage with an aperture formed in the top of the first metal bushing portion and the top of the second metal bushing portion.

A further embodiment of the present invention is the split, locknut grounding bushing as described above, wherein the first and second insulators include a tab dimensioned to overlie a space formed between the first and second insulators when connected to the first and second metal bushing portions so as to prevent electrical conductors passing through the bushing from impingement between the first and second metal bushing portions.

A further embodiment of the present invention is the split, locknut grounding bushing as described above, wherein the exterior groove of the first and second insulators is C-shaped.

A further embodiment of the present invention is the split, locknut grounding bushing as described above 9. The split, locknut grounding bushing according to claim 5, wherein the exterior groove of the first and second insulators is C-shaped.

A further embodiment of the present invention is the split, locknut grounding bushing as described above, wherein the first and second metal bushing portions are fabricated from a zinc alloy.

A further embodiment of the present invention is the split, locknut grounding bushing as described above, wherein the first metal bushing portion includes a post and the second metal bushing portion includes a bore into which the post interfits so as to facilitate alignment of the first metal bushing portion with the second metal bushing portion.

BRIEF DESCRIPTION OF THE DRAWINGS

For a fuller understanding of the nature and objects of the present invention, reference should be made to the following detailed description taken in conjunction with the following drawings in which:

FIG. 3 is a side view of the split, locknut grounding bushing shown in FIGS. 1 and 2 secured to the threaded end of a rigid conduit so as to electrically or mechanically secure the rigid conduit to an electrical panel box or the like.

DETAILED DESCRIPTION

The present invention is directed to a new type of electrical fitting, namely, a split, locknut grounding bushing that can perform three distinct functions; namely, to act as a locknut, a bushing and a grounding bushing.

Figure 1:
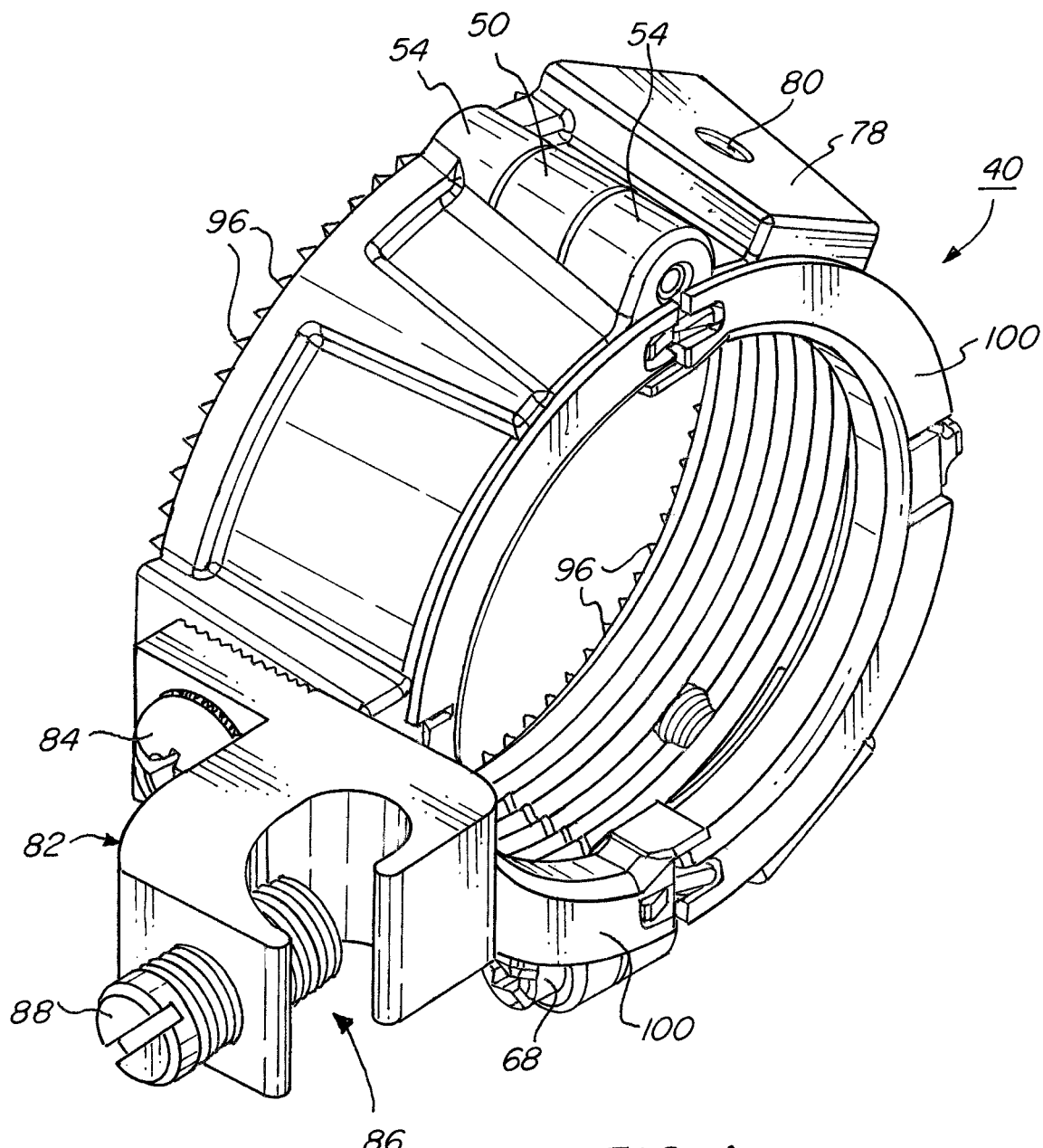
FIG. 1 is a front perspective view of an embodiment of a split, locknut grounding bushing according to the present invention.
Figure 1B:
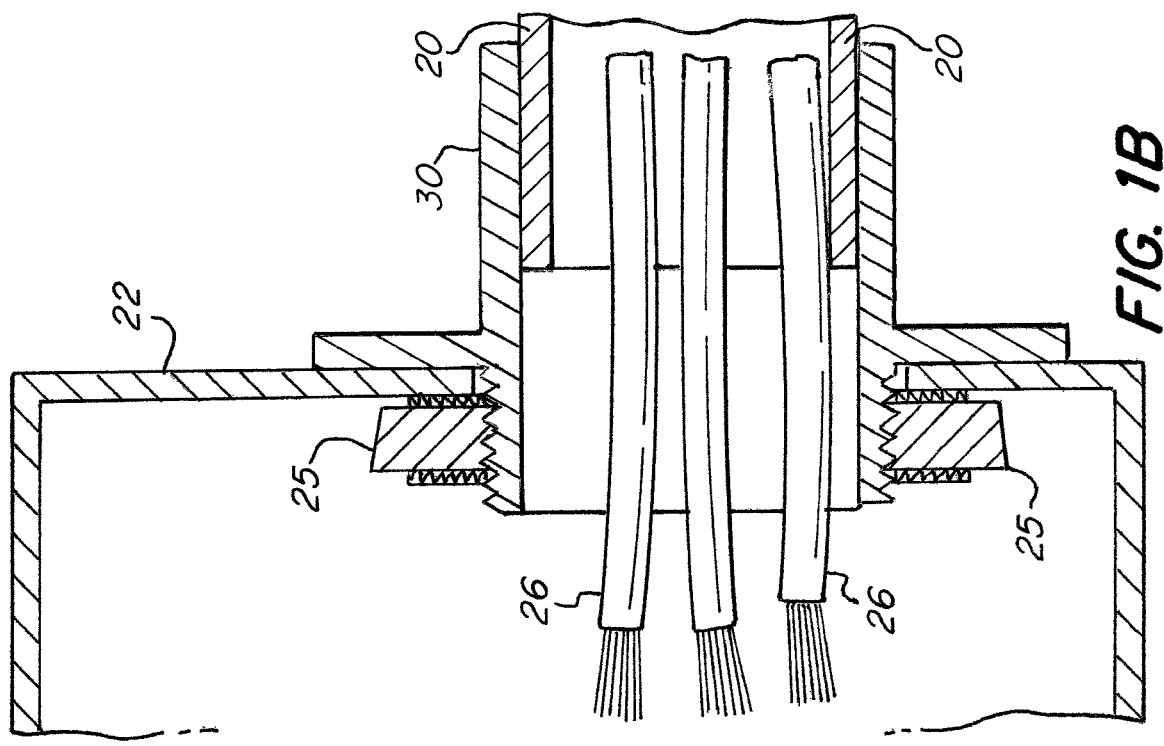
FIG. 1B is a cross-sectional view of a typical installation in which a rigid conduit is secured to a panel box by an electrical connector and a locknut.
Figure 1A:
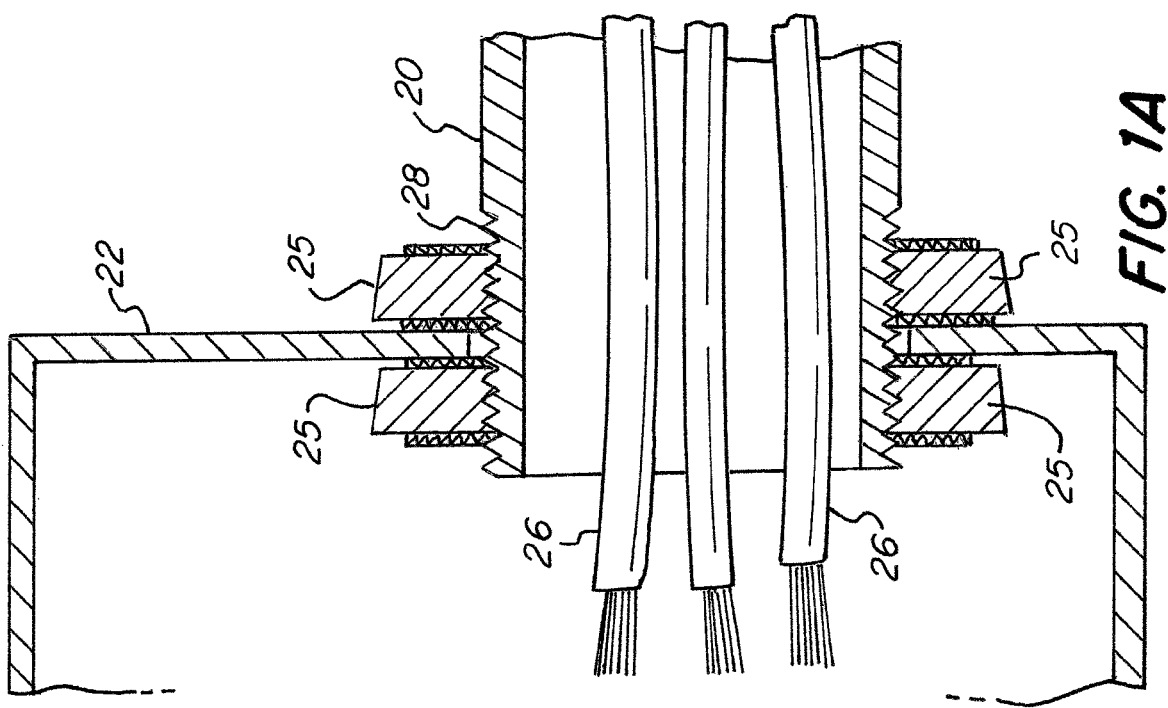
FIG. 1A is a cross-sectional view of a typical installation in which a rigid conduit is secured to a panel box by a pair of locknuts.

To better understand the nature of the environment of the present invention, FIG. 1A shows a typical installation in which a rigid conduit 20 is secured to a panel box 22 by means of a locknut 25. Conductors 26 pass through the conduit 20 entering into the panel box. After installation, it may be necessary to add a grounding bushing in order to meet specific electrical codes. Typically, this would be performed by a split grounding bushing, such as that disclosed in U.S. Pat. No. 8,419,449. However, if the threads 28 of conduit 20 do not have sufficient extension into the area beyond locknut 25, there is simply not enough "thread" onto which such a split electrical grounding bushing could be attached to the conduit.

A similar situation arises as shown in FIG. 1B when an electrical connector 30 is used to secure conduit 20 to the panel box 22, again by means of locknut 25.

Figure 3:
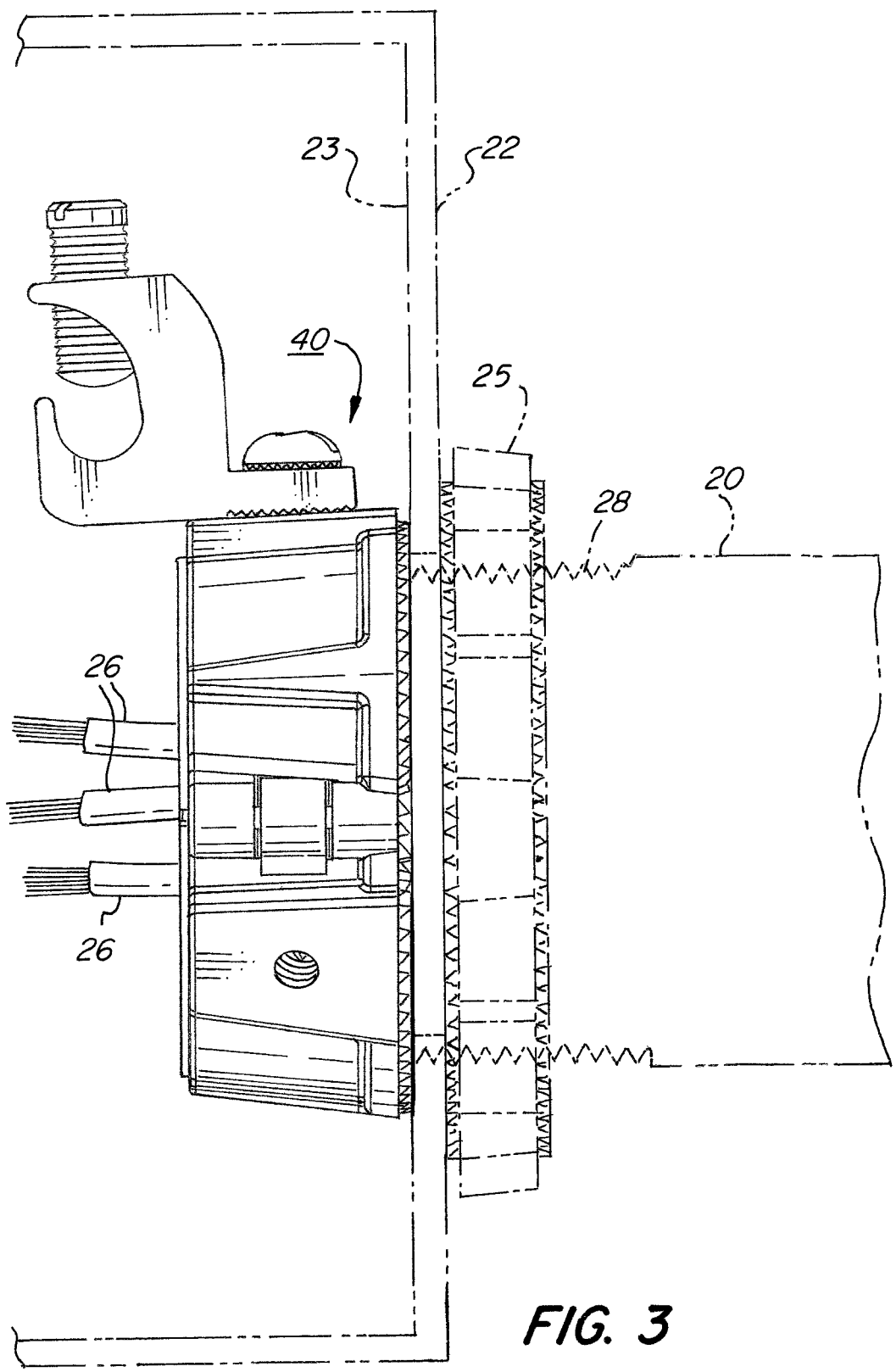
Figure 4:
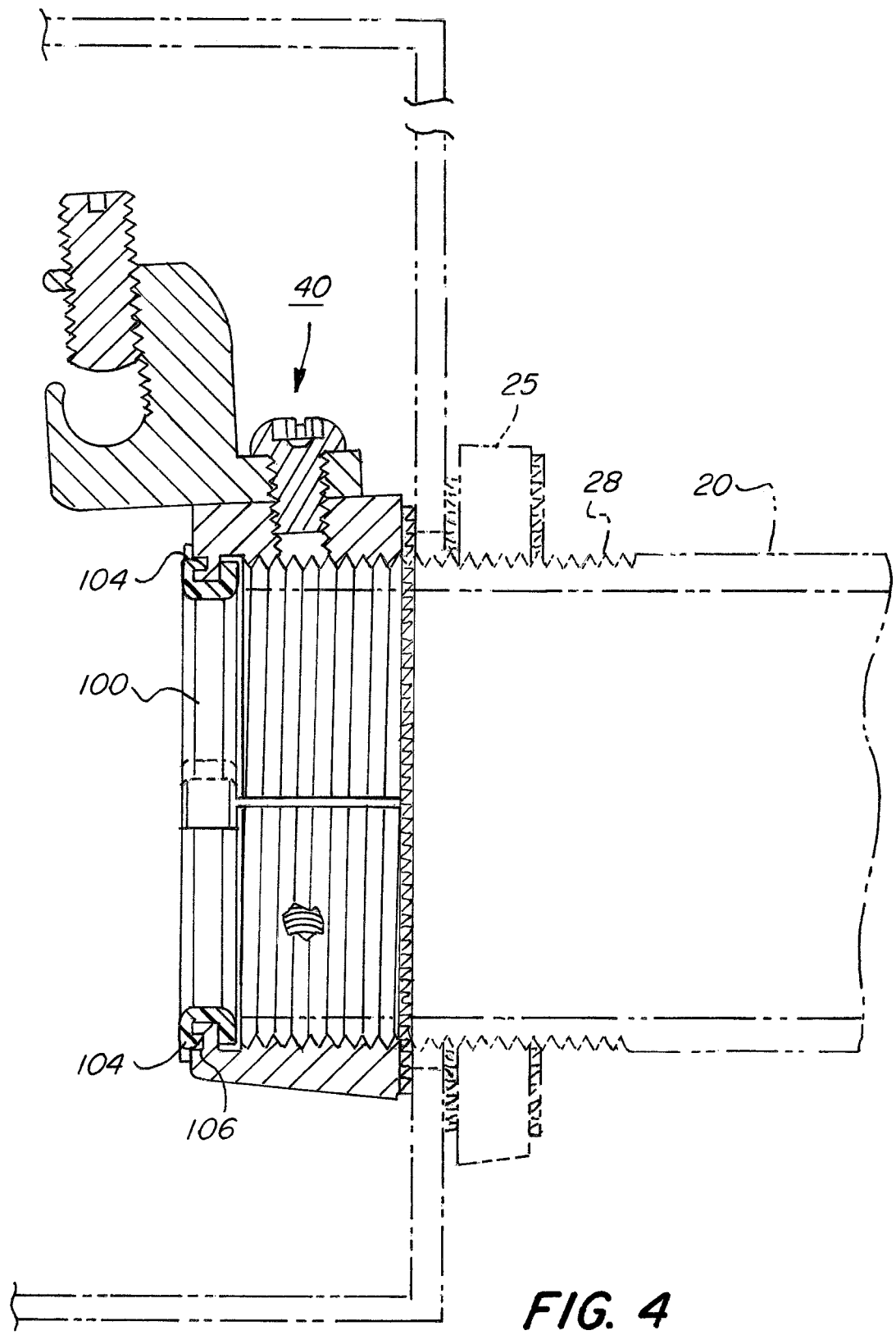
FIG. 4 is a cross-sectional view of the split, locknut grounding bushing shown in FIG. 3.
Figure 5:
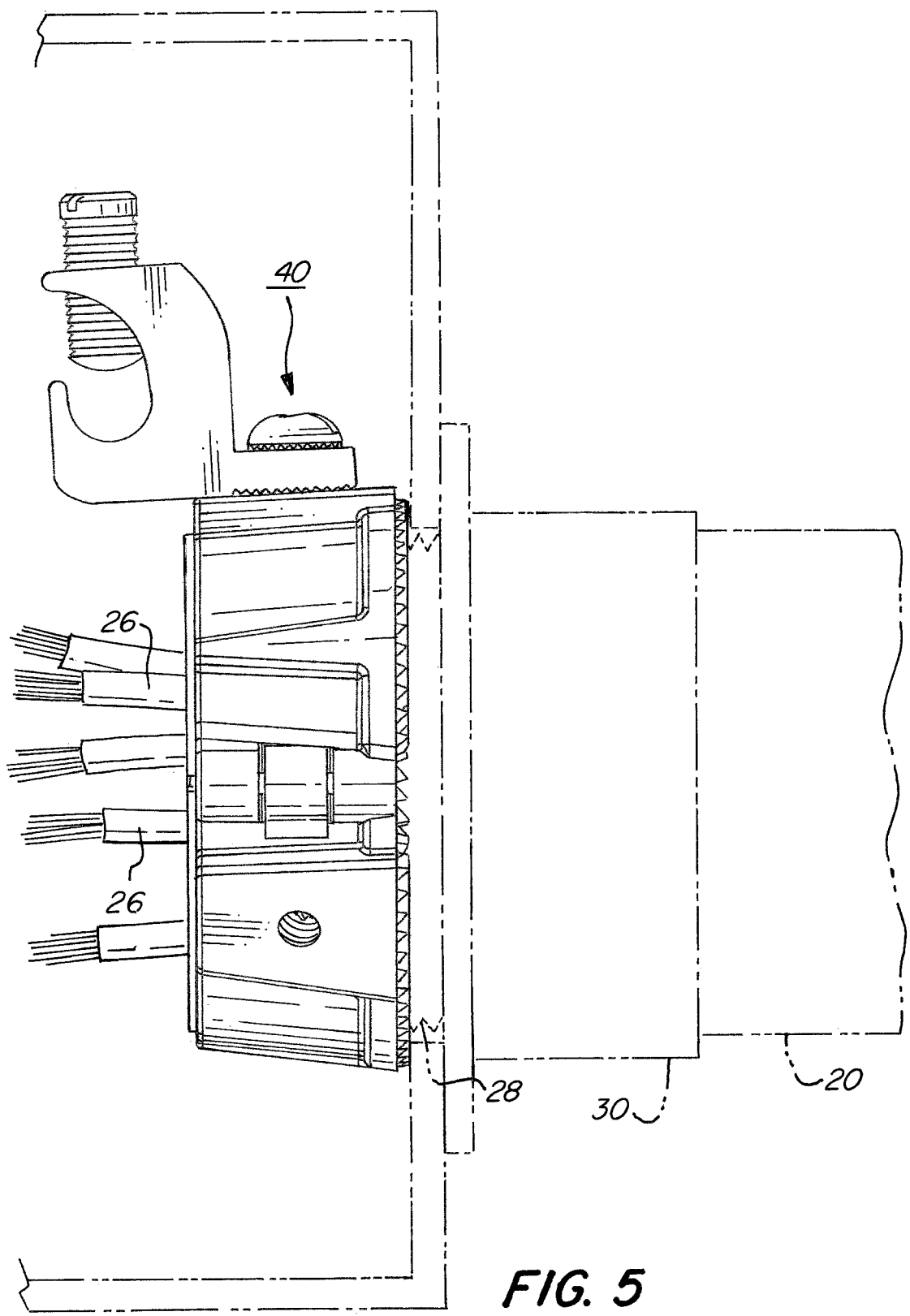
FIG. 5 is a side view of the split, locknut grounding bushing secured to the threads of an electrical connector which in turn is secured to a panel box or the like and in which a rigid conduit is in turn secured to the electrical connector.
Figure 6:
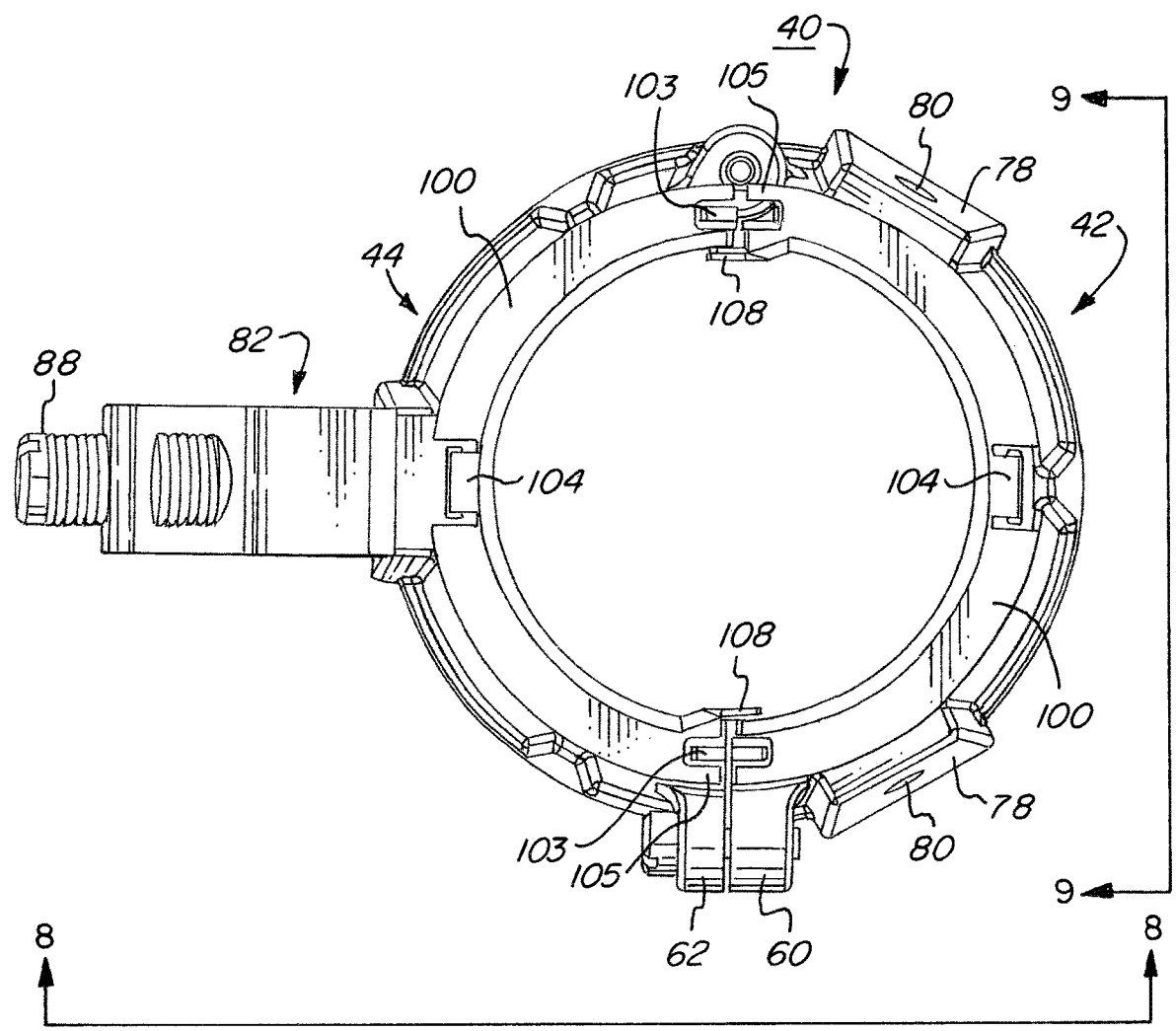
FIG. 6 is a top view of the split, locknut grounding bushing.
Figure 7:
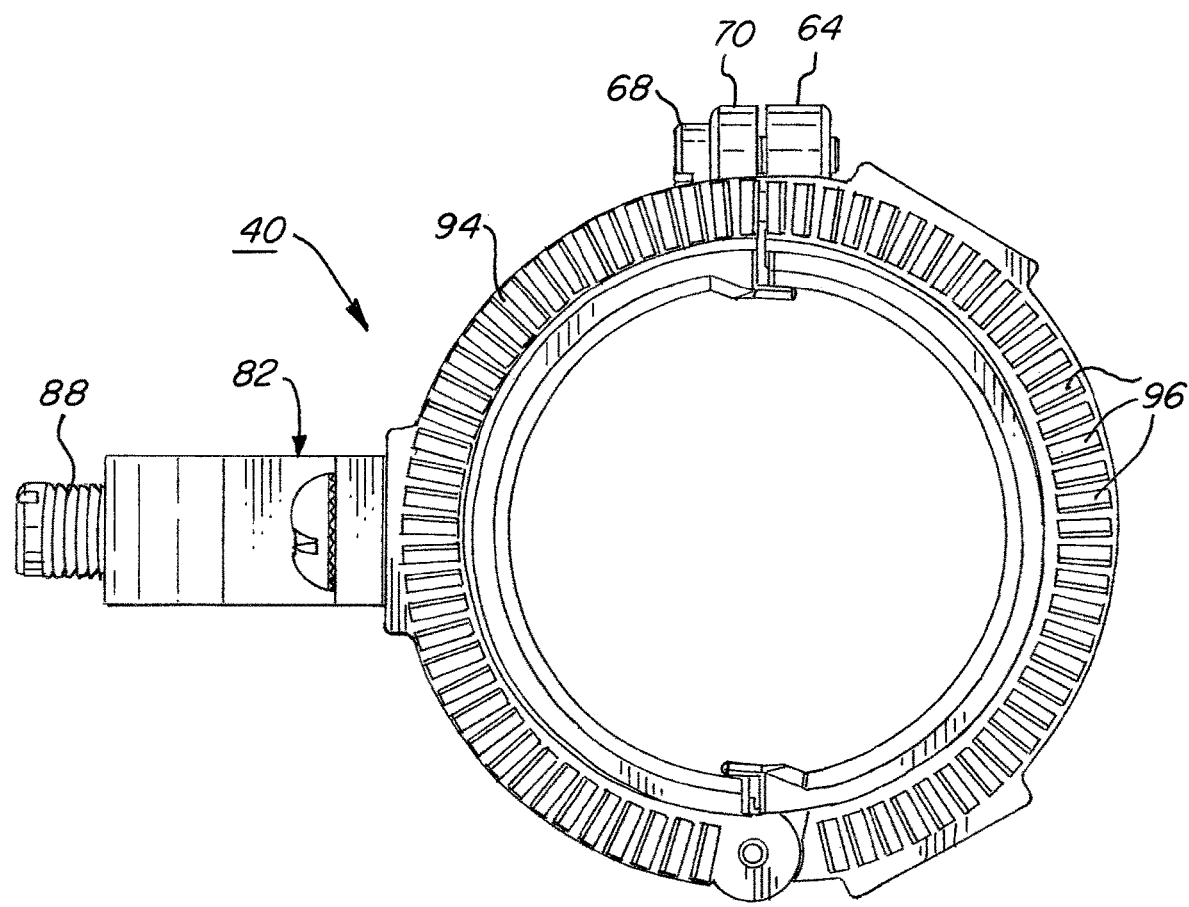
FIG. 7 is a bottom view of the split, locknut grounding bushing.
Figure 8:
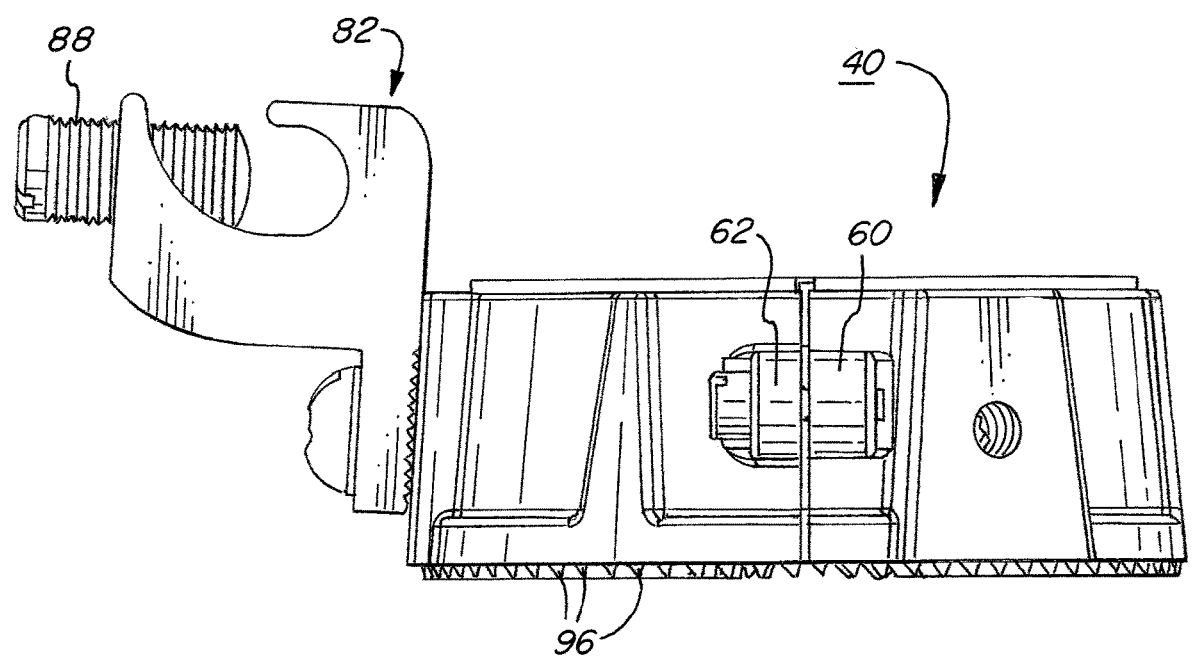
FIG. 8 is a side view of the split, locknut grounding bushing taken along line 8-8 of FIG. 6.
Figure 9:
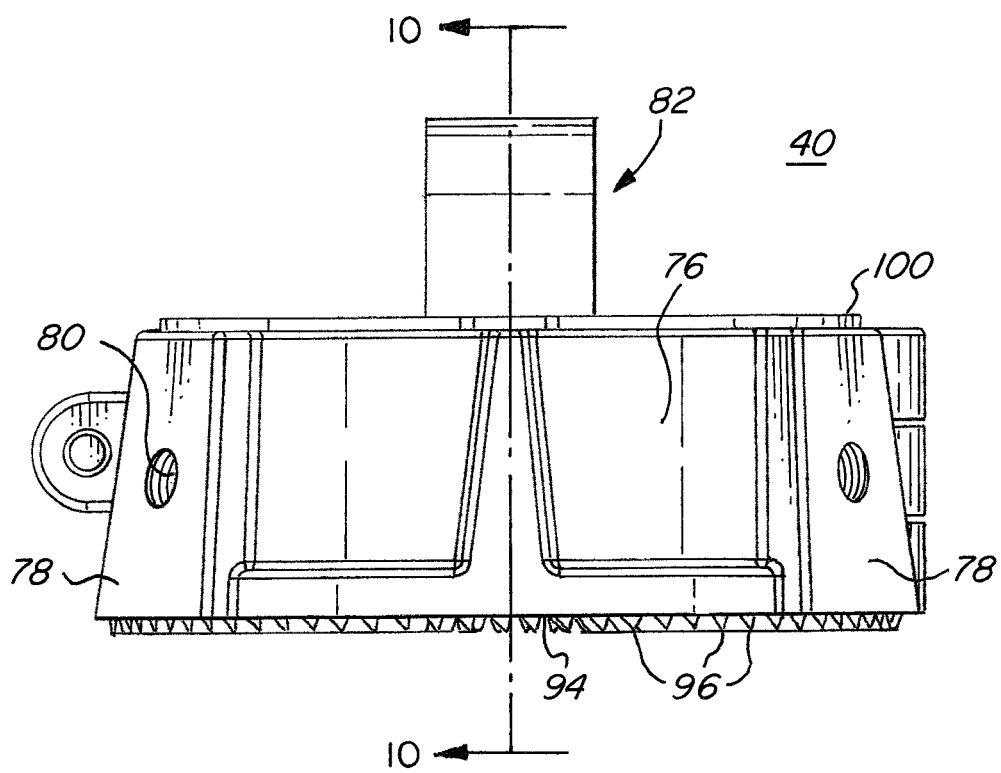
FIG. 9 is a side view of the split, locknut grounding bushing taken along line 9-9 of FIG. 6.
Figure 10:
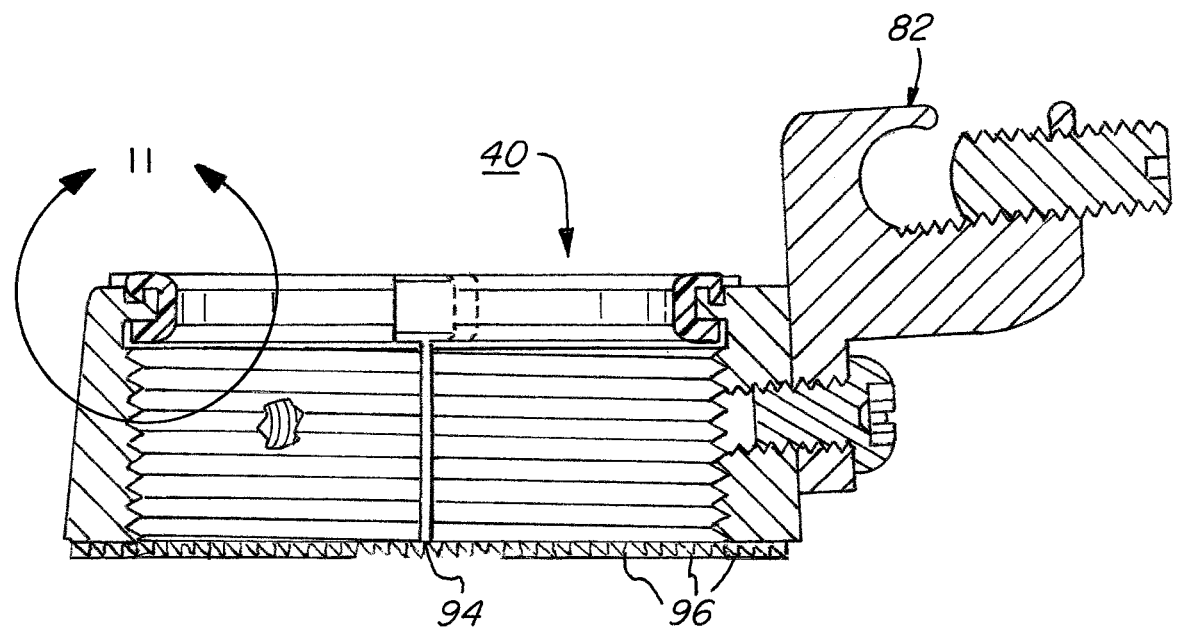
FIG. 10 is a cross-sectional view of the split, locknut grounding bushing taken along line 10-10 of FIG. 9 illustrating details of how an insulator is secured to the top portion of the grounding bushing.
Figure 11:
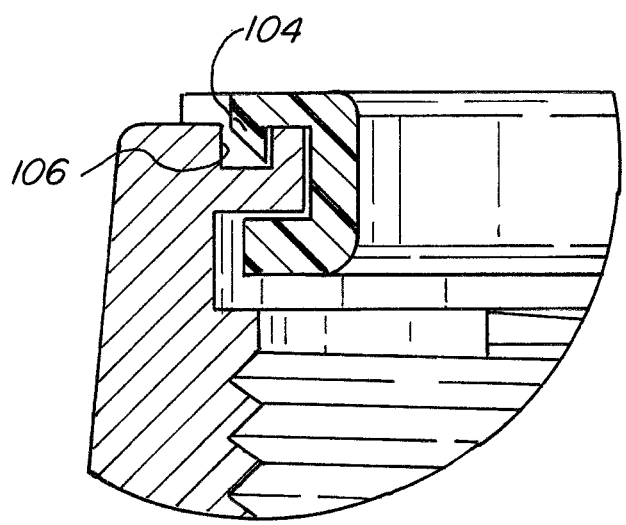
FIG. 11 is an enlarged detailed view of the insulator and top portion of a first metal bushing portion showing how the insulator is secured to the top of the metal bushing portion.

The present invention provides a unique solution to this problem by combining the features of a locknut, a bushing for protecting the terminating ends of the conductors entering into the panel box or the like, as well as a grounding bushing for providing proper electrical ground to the overall bushing relative to the panel box. This is achieved by a split, locknut grounding bushing 40 as shown in FIGS. 1, 2 and 6-11 for installations as illustrated in FIGS. 3-5. Thus, FIGS. 3 and 4 show the split, locknut grounding bushing secured to panel box 22 by threaded engagement with the threads 28 of conduit 20. A locknut 25 is also utilized to mechanically and electrically secure the conduit to the panel box 22 in a manner analogous to that shown in FIG. 1A. FIG. 4 is a cross-sectional view of the split, locknut grounding bushing.

FIG. 5 illustrates the split, locknut grounding bushing secured to the threads 28 of electrical connector 30 in a manner analogous to that shown in FIG. 1B, but where the locknut 25 is replaced by the split, locknut grounding bushing.

Details of the split, locknut grounding bushing 40 are best seen in FIGS. 1, 2 and 6-11. The split, locknut grounding bushing 40 comprises a first metal bushing portion 42 and a second metal bushing portion 44. Each metal bushing portion is substantially hemispherical in shape. The first metal bushing portion has a first end 46, while the second metal bushing portion has a first end 48. The first end of the first and second metal bushing portions are dimensioned to pivot relative to each other as explained more fully below.

Figure 2:
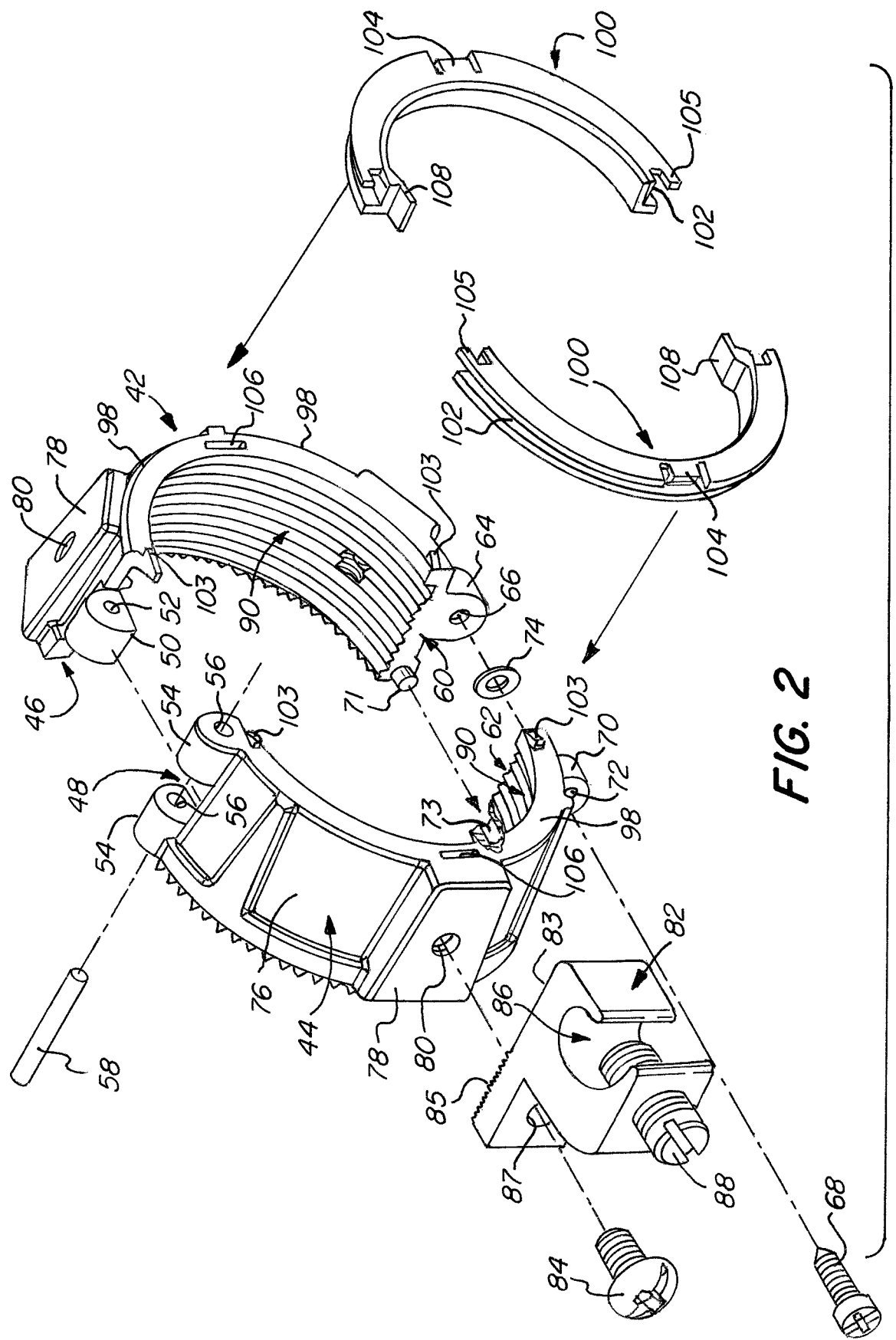
FIG. 2 is an exploded front perspective view of the split, locknut grounding bushing shown in FIG. 1.

As shown in FIGS. 1 and 2, the first end 46 of the first metal bushing portion may have a projection 50 with a through bore 52, while the first end 48 of the second metal bushing portion has projections 54 with through bores 56. A pin 58 can thus pass through bores 56 and 50 thereby allowing the first and second metal bushing portions to pivot relative to each other.

The first metal bushing portion also has a second end 60, while the second metal bushing portion has a second end 62. The second end 60 of the first metal bushing portion includes a projection 64 which may have a threaded bore 66 for threaded engagement with machine screw 68.

The second end 62 of the second metal bushing portion also has a projection 70 with a through bore 72 dimensioned for pass through of machine screw 68. The machine screw may be captured to the projection 70 by means of a plastic retaining ring 74. The first metal bushing portion may include a post 71 to interfit with a bore 73 (shown in cross-sectional cutout in FIG. 2) in second metal bushing portion so to assist in alignment of the two metal bushing portions.

The first metal bushing portion has an exterior surface 76 onto which one or more bosses 78 are formed, each threaded boss having a threaded bore 80 onto which a grounding lug 82 may be attached by means of a machine screw 84 passing through a hole 87 formed in the grounding bushing.

Similarly, the second metal bushing portion has an exterior surface 76 and a boss 78 with a threaded bore 80. The figures show the grounding lug attached to the boss 78 of the second metal bushing portion. Of course, the grounding bushing may be secured to any of the bosses on either the first or second metal bushing portions.

The grounding lug 82 includes an opening 86 for entry of a grounding wire (not shown) which is secured to the grounding lug by screw 88 being threaded into engagement with the grounding wire. Grounding bushing 82 has a bottom 83 which may include serrations 85 to facilitate a good mechanical and electrical connection of the grounding lug to either the first metal bushing portion 42 or the second metal bushing portion 44 (see FIGS. 1 and 2).

The first and second metal bushing portions also have an interior surface 90. Each interior surface includes threads 92 which align with each other and are dimensioned to threadedly engage with threads 28 on the exterior surface of the rigid conduit or electrical connector (see FIGS. 3-5).

To insure a good electrical and mechanical connection between the split, locknut grounding bushing and the interior surface 23 of panel box 22, the first and second metal bushing portions have a bottom 94 with teeth 96. The teeth make secure engagement with the interior surface of the panel box when the split locknut grounding bushing is threadedly engaged with the threads of the rigid conduit or electrical connector. In this manner, the rigid conduit is secured to the panel box either directly by the split locknut grounding bushing and corresponding locknut 25 as shown in FIGS. 3 and 4 for a rigid conduit having exterior threads 28 or via connection with the electrical connector to which the rigid conduit 20 is secured where the rigid connector is mechanically and electrically secured to the panel box by the split, locknut grounding bushing as shown in FIG. 5.

As best seen in FIGS. 2, 3, 5, 10 and 11, the first and second metal bushing portions also have a top 98 onto which insulators 100 are received. The insulators protect the electrical conductors 26 entering panel box 20 from chaffing on the first and second metal bushing portions of the split, locknut grounding bushing. Typically, the insulators are plastic insulators and snap onto the top of the corresponding first or second metal bushing portion by means of an exterior groove 102 formed in each insulator (the grooves are typically C-shaped), as well as tabs 104 which are dimensioned for snap-in engagement with apertures 106 formed in the top of the first and second metal bushing portions. Each top 98 also may include a pair of upstanding members 103 which interfit with cutouts 105 formed on the ends of insulators 100 so as to assist placement of the insulators on the first and second metal bushing portions. Of course, other configurations could be used for attaching the insulators to the top of the first and second metal bushing portions. The first and second metal bushing portions may each include a seam cover 108 which is dimensioned to cover the gap between the insulators when attached to the first and second metal bushing portions. This prevents conductors 26 from possibly entering the gap between the first and second insulators which could potentially adversely affect the electrical conductors, including cutting into the insulation of the conductors.

In typical operation, the split locknut grounding bushing is secured to the threads 28 of either a rigid conduit or electrical connector positioned within a knockout of a panel box by first removing an existing locknut 24 (see FIGS. 1A and 1B) securing the rigid conduit or electrical connector to the panel box and then placing the split, locknut grounding bushing around the threads by pivoting the first and second metal bushing portions into an open configuration, closing the first and second metal bushing portions and securing them together by machine screw 68 (see FIG. 2) and then rotating the closed split, locknut grounding bushing onto the threads until the teeth 96 make firm engagement with the interior surface 23 of the panel box; thereby providing electrical and mechanical connection of the split, locknut grounding bushing to the panel box. A ground conductor secured to the grounding lug 82 thereby provides for proper grounding of the overall installation, including the rigid conduit.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A split, locknut grounding bushing comprising:
   a first metal bushing portion having a substantially hemispherical shape with a first end and a second end, the first metal bushing portion further having a top, a bottom, an exterior surface and an interior surface, the bottom including a plurality of depending teeth, the interior surface including threads, and the exterior surface including at least one threaded boss for receipt of a lug;
   a second metal bushing portion having a substantially hemispherical shape with a first end and a second end, the second bushing portion further having a top, a bottom, an exterior surface and an interior surface, and the bottom including a plurality of depending teeth, and the interior surface including threads;
   a first insulator connected to the top of the first metal bushing portion;
   a second insulator connected to the top of the second metal bushing portion;
   means for allowing the first end of the first metal bushing portion and the first end of the second metal bushing portion to pivot with respect to each other; and
   means for fastening the second end of the first metal bushing portion to the second end of the second metal bushing portion;
   wherein the threads of the first and second metal bushing portions are dimensioned for threaded engagement with threads of a connector or threads of a conduit passing through a hole in an electrical enclosure so that the teeth on the bottom of the first and second metal bushing portions make firm engagement with an interior surface of the electrical enclosure, thereby providing electrical and mechanical connection of the split, locknut grounding bushing to the electrical enclosure.

2. The split, locknut grounding bushing according to claim 1, wherein the means for allowing the first end of the first metal bushing portion and the first end of the second metal bushing portion to pivot with respect to each other comprises the first end of the first metal bushing portion including a projection with a bore passing therethrough and the first end of the second metal bushing portion including two complimentary projections with a bore passing through each of these complimentary projections, and a pin dimensioned for placement through the bore of the projection of the first metal bushing portion and the projections of the second metal bushing portion.

3. The split, locknut grounding bushing according to claim 1, wherein the means for fastening the second end of the first metal bushing portion to the second end of the second metal bushing portion comprises the second end of the first metal bushing portion including an ear with a bore formed therein and the second end of the second metal bushing portion including an ear with an aperture dimensioned for passage of a fastener; and a retaining ring positioned for placement on the fastener passing through the aperture of the second end of the second metal bushing portion so as to secure the fastener to the bore in the ear of the first metal bushing portion.

4. The split, locknut grounding bushing according to claim 1, wherein the first and second insulators each have a hemispherical shape respectively corresponding to the top of the first metal bushing portion and second metal bushing portion.

5. The split, locknut grounding bushing according to claim 4, wherein the first and second insulators each include an exterior groove dimensioned to respectively snap onto a rim formed in the top of the first metal bushing portion and the top of the second metal bushing portions.

6. The split, locknut grounding bushing according to claim 5, wherein the first and second insulators each include a detent dimensioned to respectively engage with an aperture formed in the top of the first metal bushing portion and the top of the second metal bushing portion.

7. The split, locknut grounding bushing according to claim 6, wherein the first and second insulators include a tab dimensioned to overlie a space formed between the first and second insulators when connected to the first and second metal bushing portions so as to prevent electrical conductors passing through the bushing from impingement between the first and second metal bushing portions.

8. The split, locknut grounding bushing according to claim 1, wherein the exterior groove of the first and second insulators is C-shaped.

9. The split, locknut grounding bushing according to claim 5, wherein the exterior groove of the first and second insulators is C-shaped.

10. The split, locknut grounding bushing according to claim 1, wherein the first and second metal bushing portions are fabricated from a zinc alloy.

11. The split, locknut grounding bushing according to claim 1, wherein the first metal bushing portion includes a post and the second metal bushing portion includes a bore into which the post interfits so as to facilitate alignment of the first metal bushing portion with the second metal bushing portion.

* * * * *